United States Patent [19]

Matiere

[11] Patent Number: 4,869,294
[45] Date of Patent: Sep. 26, 1989

[54] BURIED LARGE CROSS-SECTION CONDUIT

[76] Inventor: Marcel Matiere, 17 avenue Aristide Briand, Aurillac 15000, France

[21] Appl. No.: 157,157

[22] Filed: Feb. 11, 1988

Related U.S. Application Data

[62] Division of Ser. No. 838,375, Mar. 11, 1986, Pat. No. 4,735,234.

[30] Foreign Application Priority Data

Jul. 13, 1984 [FR] France ............................ 84 11173
Nov. 5, 1984 [FR] France ............................ 84 16811

[51] Int. Cl.⁴ .............................................. F16L 9/22
[52] U.S. Cl. ................................. 138/105; 138/157; 138/172; 138/155; 138/161; 138/103; 405/126
[58] Field of Search ............... 138/103, 105, 119, 157, 138/158, 155, 159, 160, 161, 100, 167, 175, 172, 178, 120; 405/124, 125, 126, 149, 150

[56] References Cited

U.S. PATENT DOCUMENTS

| | | | |
|---|---|---|---|
| 868,819 | 10/1907 | Snoddy | 138/161 |
| 1,638,428 | 8/1927 | Zander | 405/126 |
| 1,966,863 | 7/1934 | Kipp | 138/161 |
| 2,280,339 | 4/1942 | Meyers | |
| 4,314,775 | 2/1982 | Johnson | 405/124 |
| 4,693,635 | 9/1987 | Matiere | 405/126 |

FOREIGN PATENT DOCUMENTS

| | | | |
|---|---|---|---|
| 111556 | 2/1940 | Australia | 138/161 |
| 55913 | 11/1935 | Norway | 138/161 |
| 27446 | of 1911 | United Kingdom | 138/161 |

*Primary Examiner*—James E. Bryant, III
*Attorney, Agent, or Firm*—Frost & Jacobs

[57] ABSTRACT

A buried conduit consisting, in transverse cross-section, of a lower component (2) and a covering upper component (1) which bears on the upper part of the side walls (22) of the lower component (2) by means of lengthwise bearing members (3). According to the invention, the upper component (1) forms an arched vault made so as to have sufficient flexibility to distort slightly under the effect of the forces to which it is subjected, and the lower component (2) is made so as to resist, without distortion, the forces transmitted by the ground and by the upper component (1), both components being fixed to each other along the lengthwise bearing members (3) and the latter consisting of socket joints, so as to permit the bearing parts of the distortable upper component to pivot without sliding relative to the undistortable lower component.

3 Claims, 2 Drawing Sheets

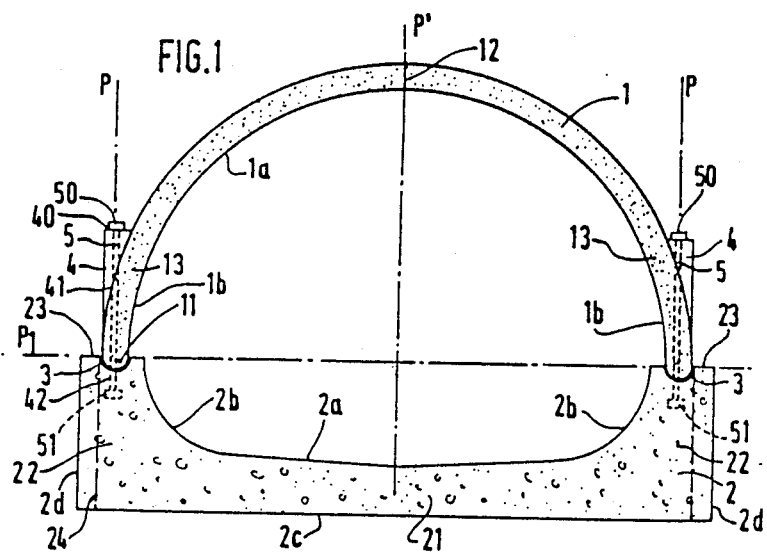
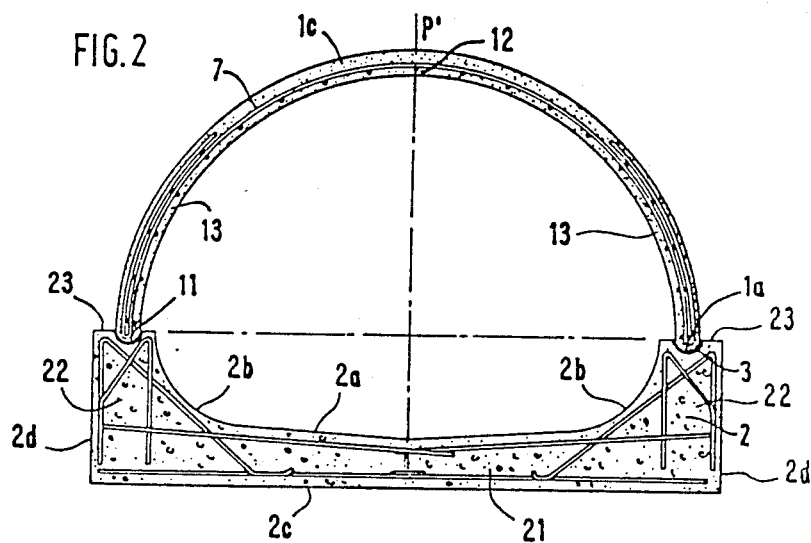

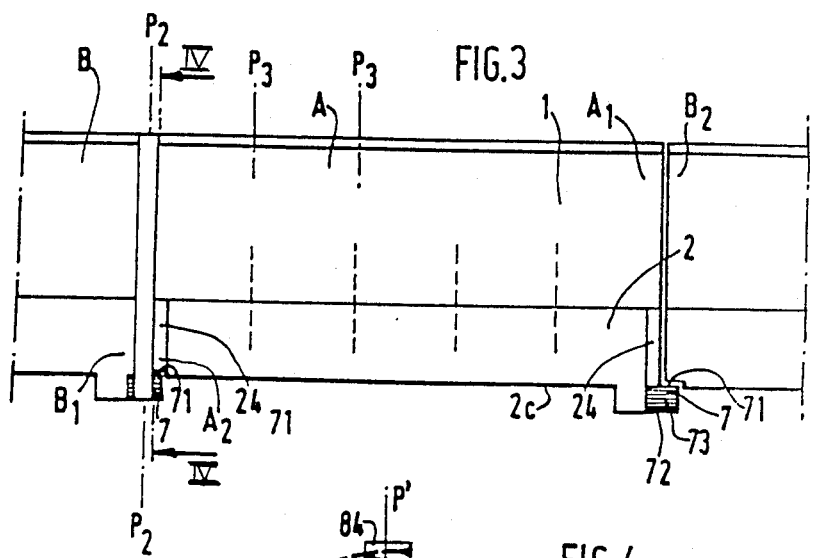
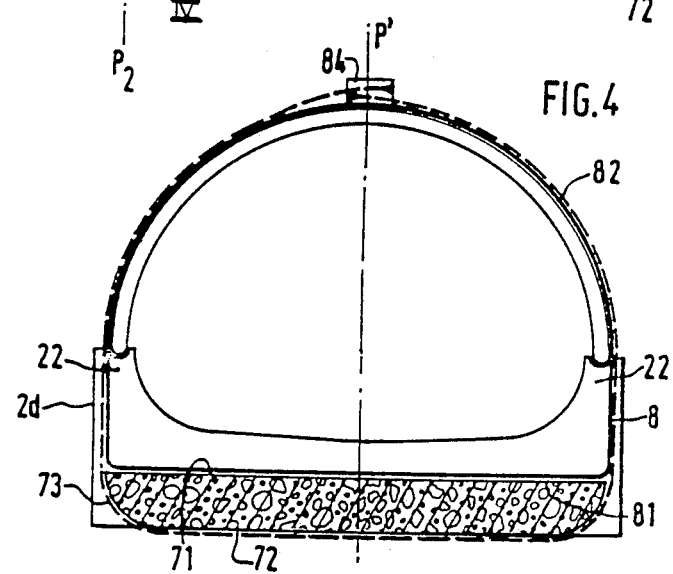
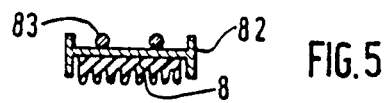

4,869,294

BURIED LARGE CROSS-SECTION CONDUIT

This is a division, of application Ser. No. 06/838,375, filed Mar. 11, 1986, now U.S. Pat. No. 4,735,234.

FIELD OF THE INVENTION

The present invention relates to a buried conduit of large cross-section, especially in transverse cross-section, the latter being capable, for example, of amounting to several square meters.

PRIOR ART

Buried conduits have been made of masonry, concrete, or metal sheet for a very long time, but, in general, these conduits, intended, for example, for sanitation systems, have been of relatively small size, generally less than 1 m².

However, it is sometimes necessary to construct buried conduits of larger size, which can go up to several square meters in cross-section, for example to channel a river or a passageway under a highway embankment, or to construct high-throughput sewers or culverts; many such applications can be envisaged. In most cases, these conduits are constructed in masonry or in concrete which is cast in situ.

However, the Applicant Company has already proposed a large cross-section conduit, described in European Patent Application published under No. 81,402. This conduit, consisting of several associated cylindrical components, and usually made of reinforced concrete, is sufficiently rigid to withstand the forces transmitted by the backfill or by the fluid flowing inside it, under pressure if appropriate.

However, when buried conduits are constructed, it may be advantageous to use semi-rigid, or even relatively flexible structures, in which, by virtue of a slight distortion of the conduit under the effect of the loads to which it is subjected, it is possible to relieve the upper part of the vault by partially transmitting the forces to the side parts, which bear on the adjacent ground. Until now such flexible conduits have been made of metal sheet, generally corrugated. Now, in the case of structures which are intended to be in use for many years, a metal sheet may not have sufficient corrosion resistance and, furthermore, in the case of conduits for conveying liquids, the corrugations which are required to reinforce the mechanical strength of the wall, reduce the flow efficiency of the fluid. This is why it is advantageous, especially in the case of large cross-section conduits, to make use of a reinforced concrete structure.

The document No. DE-A-2,461,863 describes a buried reinforced concrete conduit consisting of three components, a bottom and two side walls respectively, jointed onto each other to form a circular cross-section, the joints being placed one at the crown and the other two on either side of the median plane. Such a construction offers some possibility of distortion, but also a risk that the joints may slide. In addition, in the case of large cross-section conduits, it may be quite difficult to lay the various components of the conduit.

SUBJECT AND SUMMARY OF THE INVENTION

The subject of the invention is a new type of prefabricated conduit which, while offering a flexibility comparable to that of metal conduits, has the advantage of being capable of being made of reinforced concrete and, at the same time, being easy to lay, even when large in cross-section.

Such a conduit, according to the invention, consists, in transverse cross-section, of two superposed components, a lower component comprising a flat-bottomed base raised at its edges by two substantially vertical side walls, and a covering upper component which bears on the top part of the side walls of the lower component by means of lengthwise bearing members arranged along the adjacent rectilinear edges of the two components and placed in a joint plane parallel to the bottom of the base, respectively.

In accordance with the invention, the upper component forms an arched vault made so as to have sufficient flexibility to distort slightly under the effect of the forces to which it is subjected, and the lower component is made so as to withstand, without distortion, the forces transmitted by the ground and by the top component, both components being fixed to each other along the lengthwise bearing members and the latter consisting of socket joints, so as to permit the bearing parts of the distortable upper component to pivot without sliding relative to the undistortable lower component.

In a particularly advantageous embodiment, the bearing forces of the upper component on the lower component are directed along each lengthwise joint, in two substantially vertical planes, and the two components are fixed to each other by retention means which apply clamping forces parallel to the bearing forces. Said retention means are located in the series of planes which are transverse to the long axis and are distributed over the length of said upper and lower components, each of said retention means comprising at least one clamping strap completely surrounding at least said upper component, and bearing on both sides of the lower component, thereby providing pivoting bearing of said upper component with respect to said lower component without risk of lateral sliding.

To lay the conduit, it is advantageous to proceed as follows:

After a trench has been dug and its flat bottom has been aligned to the required level, the lower component is first laid and then it is very quickly covered with the vault-shaped upper component whose edges bed in the grooves of the lower component. This operation requires no shoring-up and is therefore quite fast, the assembly time being capable of being shorter than the ground decompression time, which makes it possible to avoid lining of the excavation, which is always time-consuming and costly. In this case, the side walls of the lower component form a particularly advantageous provisional protection against minor ground collapses which can occur at the bottom of the excavation. In addition, the base has a flat bottom which is as wide as possible, and this provides it with a perfect bedding on the soil.

Furthermore, when the conduit is intended to carry a sewer or a river, it must generally be calculated not for an average flowrate, but for a maximum flowrate, for example in the event of a flood. It is then advantageous to provide the side walls with a sufficient height in order that their upper faces, on which the lengthwise bearing members are arranged, remain above the level of the liquid for an average flowrate. The joints are thus protected in the majority of circumstances and the lower component, whose height is determined so that the passage cross-section corresponds to the average flowrate, may be covered with a protective skin made of a synthetic material or metal and chosen as a function of the service conditions.

It is especially advantageous to give the inner faces of the side walls of the lower component and the side bearing parts of the upper component the shape of a circular cylindrical sector whose center lies in the joint plane. This ensures the continuity of curvature of the conduit, which is favorable to good flow and, at the same time, a gradual downward widening of the side walls of the lower component is provided, increasing their resistance to being overturned, consequently enabling, in particular, a calculated metal reinforcement to be fitted.

As already indicated, in order to ensure pivoting, without sliding, of the bearing parts, and also to withstand a possible internal pressure, the two components are joined to each other by retention means which can advantageously consist of a series of clamping straps placed in planes which are transverse to the axis and distributed along the length of the component, and forming, in each transverse plane, a closed loop completely surrounding the assembly of the two components.

In a more highly developed embodiment, in which the conduit consists of a series of individual lengths placed one following another and each comprising a lower component and an upper component, which are superposed, the base of each length is provided, in the joint plane, with an extension which passes below the adjacent part of the base of the following length, which thus beds on the adjacent extension. The latter comprises a planar lower face parallel to the lower face of the adjacent base and joining up with the outer faces of the side walls by means of round faces. In this way, the adjacent ends of the two lengths are covered by a gasket shaped like a continuous band and whose lower part passes between the faces (upper and lower, respectively) of the extension and of the adjacent base, and the leaktight seal can be covered with a hoop in the form of a section of the same width passing below the extension and tensioned so as to place the gasket under pressure against the walls of the conduit. For this purpose, use can be made of at least one clamping cable which passes over the outer face of the hoop and whose ends are brought together, in the median plane of the conduit, in an anchoring device placed above the crown of the upper component and equipped with means for tensioning the cable to a prestress tension capable of withstanding an opening force on the lengthwise joints due to the effect of the stresses to which the conduit is subjected when in service.

In another embodiment, the means for retention of the two components consist of at least one clamping cable wound in a spiral around the conduit length formed by the coupling of two components and over their entire length, this cable being capable of being wound over the outer faces of the conduit or, alternately, passed through a tubular conduit, wound in a spiral and each turn of which comprises two parts arranged within the thickness of the wall of the upper component and of the lower component respectively, and whose outlet orifices are arranged along the side edges of the two components, so as to coincide in pairs when the upper component is laid on the lower component.

BRIEF DESCRIPTION OF THE DRAWINGS

The invention will be understood better from the detailed description, which does not imply any limitation, of a particular embodiment of a large cross-section conduit according to the invention, with reference to the attached drawings, in which:

FIG. 1 is an end view of a vault of a large-sized conduit, according to the invention;

FIG. 2 is a view of the conduit in cross-section;

FIG. 3 is a side view of the connection between three consecutive lengths of a conduit;

FIG. 4 is a view in cross-section along the line IV—IV of FIG. 3; and

FIG. 5 is a detailed view, in cross-section, of the seal and of its application hoop.

DESCRIPTION OF THE PREFERRED EMBODIMENTS

The conduit according to the invention consists, conventionally, of a series of consecutive lengths, each comprising, as shown in cross-section in FIG. 1, an upper component 1 and a lower component 2.

The upper component 1 is arched in the shape of a vault, preferably semi-circular in cross-section. It is laid onto the lower component 2, by means of lengthwise bearing members 3 which, according to an essential feature of the invention, are made so as to form socket joints capable of pivoting slightly, about a vertical bearing plane P. For this purpose, the lower component 2 is provided with two lengthwise grooves with curved bottoms 3 which form semi-cylindrical gutters on which the side edges 11 of the upper component 1 can be bedded, these side edges having a rounded outline with a radius of curvature which is slightly less than that of the bottom of the groove 3.

According to one of the features of the invention, the vault 1 is made so as to have sufficient flexibility to distort slightly under the effect of the forces to which it is subjected. Several ways of producing a vault which enable the required flexibility to be obtained will be indicated hereinafter.

The lower component 2, on the contrary, is made so as to withstand without any distortion the forces transmitted by the ground and by the vaulted upper component 1.

As shown in the drawings, the lower component 2 consists advantageously of a base 21 with a flat bottom 2c, raised at its edges by two side walls 22, whose outer faces 2d are substantially vertical and whose upper faces 23 have a thickness which is substantially greater than that of the vaulted component 1. The inner face of the base comprises a central part 2a which is substantially horizontal or, preferably, in the case where a water-carrying conduit is produced, slightly curved, so as to have a low point in the median plane of the conduit. On both of its sides, the central part 2a is raised by two curved faces 2b which form the inner faces of the side walls 22. Preferably, the inner faces 2b have the shape of cylindrical sectors whose centers lie in the joint plane P1 passing through the upper faces 23 of the component 2, and which also contains the centers of at least the bearing parts 1b of the inner face 1a of the upper component 1, this inner face generally consisting of a cylindrical sector whose center lies in the plane P. This ensures a continuity of the curvature along the conduit, which favors good liquid flow. At the same time, such a widening of the base of the side walls 22 of the lower component 2 make it easier to absorb horizontal stresses without distortion, making it possible, in particular, to incorporate a suitable metal reinforcement, as shown in FIG. 2.

Various means may be employed to give the vault 1 the required flexibility, the design according to the invention having been made possible, in particular, by the progress made in the methods of calculating and producing reinforced concrete structures and in the knowledge of the behavior of an infill.

In particular, the vault can be constructed in reinforced concrete in the manner shown in FIG. 2, the metal reinforcement comprising semicircular loops 7, curved back to form a hairpin bend at both of their ends, so as to form one sheet of metal reinforcement in the median part 12 and two sheets in the side parts 13. This would be a simple way of increasing the strength of the more heavily loaded side parts, the vault tending to become oval under the effect of the loads transmitted by the infill, the central part 12 can be relieved, while the vault bears on the soil outside with its sides 13.

This slight distortion of the vault 1 manifests itself as a minor pivoting of the joints 11 about the plane P and, to maintain the continuity of the conduit and to avoid the risk of sliding of the joints, the latter are fixed by retention means 5 which, in the example shown in FIG. 1, consist of simple bolt-shaped rods 5 which pass through orifices provided along vertical planes P through bosses 4 placed on both sides of the vault 1 and which are extended by blind holes 42 in the side parts 22 of the base. At their top ends, the bolts 5 are provided with a head 50 for bearing on the bosses 4, and their lower, threaded end screws into nuts 51 placed at the bottom of the blind holes 42, the latter being also capable of being merely provided with internal threading.

The retaining rods 5 are placed in the vertical planes P which pass through the bottom of grooves 3 and which are thus directed substantially in the same direction as the bearing forces of the upper component 1 on the lower component 2, especially when the upper component 1 is in the shape of a semi-cylindrical vault. A pivoting bearing is thus produced without any risk of the vault 1 sliding on the undistortable lower component 2.

The calculation of the vault makes it possible, in a known manner, to determine a point of force reversal, situated substantially halfway up the vault and the double layer of metal reinforcement will be extended up to this point. In this example shown (FIGS. 1 and 2), the vault has a constant thickness, but it would also be possible to reduce gradually, starting from the point of force inversion, the thickness of the vault up to the median plane P', so as to increase the flexibility of the central part 12.

This is shown with respect to vault 1c in FIG. 2. It would further be possible to reduce the thickness of both sides of the vault 1, shown in FIG. 1, from the joints 11 to the median plane (P').

As shown in FIG. 3, the conduit consists of a series of lengths placed one following another and adjoined along the vertical joint planes P2.

The leakproof sealing between the lengths in the joint plane P2 can be produced internally, in a similar manner to that which has been described in U.S. Pat. No. 4,735,234 for the horizontal joint between the upper component and the lower component of each length. However, it will be preferable to use the arrangement shown in FIGS. 3 and following, which has the advantage of being capable of being produced from the outside of the conduit.

In this embodiment, each lower component 2 of each component A is provided, at one of its ends A1, with an extension 7 comprising a planar upper face 71 placed in the extension of the lower face 2c of the base. As a result of this, when the conduit is being constructed, when the component A is positioned following component B, already constructed, the end A2 of the base which is placed on the side adjoining the component B is laid on the bearing face 71 of the extension 7 of the component B. The other end A1 of the length A being provided with an extension 7 which, in its turn, supports the following length C.

FIG. 4, which is an end view, in cross-section through a plane IV—IV, slightly offset relative to the joint plane P2, shows the arrangement of the seal which is placed over the outside of the conduit.

In this case, the gasket is in the shape of a continuous band of a synthetic material or of rubber surrounding, on the outside, the adjacent ends of the upper components 1 and of the outer faces 2d of the side walls of the lower components of two consecutive lengths A and B. The same band passes between the facing sides 2c and 71 of the end of the connection A2 of the component A and of the extension 7 of the component B, so that it is compressed between the said sides when the component A is laid. In this region, the seal is narrower, of course, than in the upper part which covers both components and, after being installed, it can be completely by a mastic seal which provides a connection with the end P1 of the length B.

The lower face of the extension 7 comprises a central portion 72, parallel to the upper face 71, and connected, by rounded faces 73, to the outer side faces 2d of the lower component 2. In general, as shown in the Figures, the side walls 22 of the lower component 2 are given a width which is greater than that of the vault component 1, in order to provide sufficient rigidity. In this case, both ends of the lower component 2 of each length are equipped with vertical recessed faces 24 which lie in the extension of the outer face of the vault component. Thus, as can be seen in FIG. 6, an outer surface is produced which is free from any discontinuity of curvature and on which a hoop 82 can be placed for applying the seal against the outer wall of the conduit.

As shown in FIG. 5, the seal 8 may advantageously consist of a comb seal comprising ribs which can be compressed against the wall of the conduit. On the outside, the application hoop 82 can be a U- or H-section metal section which makes it possible, on the one hand, to hold the seal 8 laterally while retaining the possibility of compression and, on the other hand, to hold the clamping cables 83 on the outside.

By virtue of the rounded shape given to the outer face of the extension 7, the hoop 82 can, in fact, be tensioned so as to compress the band seal 8. Further to this, other hoops could be placed, if appropriate, in planes P3 perpendicular to the axis and distributed uniformly along the length A and used, in this case, as means for holding the two components clamped to each other, so as to replace the rods 5, described earlier. Naturally, the hoops placed within the length would not be associated with a seal, which would be unnecessary in this case, and would merely act as straps.

Each hoop would pass below the lower component 2 and its ends would be brought together at a means for joining and tensioning 84 placed on the upper portion of the vault component 1, in the median plane of the conduit. When the conduit is not intended to withstand an internal pressure, the use of hoops which are merely tight may be sufficient. In general, however, the conduit is intended for conveying fluid which may be placed under pressure. For this reason, it is advantageous to combine the hoops 82 with prestressed cables 83, placed under a sufficient tension to resist the forces tending to open the joints 3 under the action of the stresses to which the conduit is subjected in service. These cables 83 are placed, as shown in FIG. 5, on the outer face of the hoop 82, and their ends are brought together at a means of anchoring and tensioning 84 placed on the outside, at the crown of the vault. This arrangement can be used equally well in the joint plane P2, and in the intermediate plane P3, in which the hoop associated with the prestressed cables serves solely as a strap, without the insertion of a seal.

Depending on the prestressing tension of the cables 83, various known means for anchoring and tensioning, for example those for the manufacture of prestressed concrete, can be used. For example, one of the hoops could be equipped with a bearing plate which could be placed in the median plane and to which the ends of the cables subjected to tensions in opposite directions could be fixed, one of the ends being fitted, for example, with a wedge-locking system allowing locking after tensioning by means of a jack.

The leakproof sealing along the lengthwise bearing members can be provided, as before, by a rubber or neoprene seal inserted between the end 11 of the vault and the bottom of the groove 3 while beads of mastic which are placed after the installation make it possible to ensure the continuity of the sealing along the joint planes P1 and P2.

Of course, the invention is not limited to the details of the embodiments which have just been described by way of an example, and other alternative forms can equally be imagined, without departing from the scope of the protection defined by the claims.

For example, to produce the flexible vault according to the invention, it may be advantageous to use special types of concrete such as, for example, resin concretes or fiber concretes, in which the reinforcements are replaced by small-sized metal fibers embedded inside the concrete. Similarly, it would advantageously be possible to produce a vault which is light, strong and flexible at the same time, especially in its central part. As a general rule, it will advantageously be possible to make the vault and the base of materials of different kinds, chosen as a function of the forces to which they are subjected and of the conditions of use.

Other ways of installing and attaching the strapping hoops could also be envisaged. For example, it would be possible to use prestressing cables wound in a spiral around the two assembled components, over their entire length, or even passing through a tubular conduit, itself wound into a spiral, and each turn of which would comprise two parts arranged within the thickness of the concrete, one in the upper component and the other in the lower component, the outlet orifices being distributed along the side edges of the two components so as to coincide in pairs when the upper component is laid on the lower component.

Lastly, in the example described above, each hoop which forms a clamping strap, as well as the prestressing cables, completely surrounds the conduit, passing below the base. Consequently, the hoops need to be fixed to the base 2 before the latter is laid and must then be lifted off for laying the vault 1 and must finally be brought down over the latter again and fixed to the tensioning device 84.

It would also be possible to use hoops and/or prestressing cables made in two parts lying symmetrically on both sides of the median plane P', and placed after the laying of the vault 1, the lower end of each hoop being equipped with an anchoring member capable of engaging with a corresponding member provided on the side wall 22 of the lower component 2.

It should be noted that, in all cases, laying of the conduit can be carried out without the involvement of unprotected personnel at the bottom of the excavation.

What we claim is:

1. Buried conduit made of concrete intended to be laid at the bottom of a trench and covered with fill material, said conduit comprising at least one assembly of two superposed components constituting a lower component and an upper component, said lower component comprising an elongated concrete base having a top surface, a flat horizontal bottom surface and terminating along its longitudinal edges in upstanding side walls, said side walls each having a substantially vertical outer surface, a substantially horizontal top surface and a downwardly and inwardly curved inner surface terminating in said base top surface, said side wall top surfaces being coplanar and each having a longitudinal groove formed therein with a rounded bottom comprising an elongated bearing surface, said upper component comprising an elongated concrete arched vault terminating in longitudinal edges of rounded cross-section having a radius of curvature slightly smaller than that of said base groove bottoms, said longitudinal edges of said upper component being received and supported in said base grooves forming socket joints, said upper arched vault component having arcuate side bearing portions joined by an upper central portion, said side portions being constituted for increased strength and said upper central portion being constituted for increased flexibility permitting slight distortion of said upper component with slight pivoting of its longitudinal edges in said socket joints, said upper component becoming slightly oval under the effect of loads transmitted by said fill material, a plurality of retention means attaching said upper and lower components to each other, said retention means being located in a series of planes which are transverse to the long axis and are distributed over the length of said upper and lower components, each of said retention means comprising at least one clamping strap completely surrounding at least said upper component, and bearing on both sides of the lower component, whereby to provide pivoting bearing of said upper component with respect to said lower component without risk of lateral sliding.

2. Conduit as claimed in claim 1, wherein each clamping strap comprises at least one cable completely surrounding the conduit while passing below said lower compartment, said cable having ends joined together at an anchoring device placed above the longitudinal center of the upper central portion of the upper component.

3. Conduit as claimed in claim 2, wherein the device for anchoring the ends of the cable is equipped with means for tensioning the cable to a prestressing tension capable of withstanding a force tending to open the lengthwise joints under the action of the stresses to which the conduit is subjected in service.

* * * * *